(12) United States Patent
Ting et al.

(10) Patent No.: US 11,073,726 B2
(45) Date of Patent: Jul. 27, 2021

(54) DISPLAY DEVICE HAVING REDUCED SIZE AND IMPROVED ILLUMINATION

(71) Applicant: Innolux Corporation, Miao-Li County (TW)

(72) Inventors: Chin-Lung Ting, Miao-Li County (TW); Ming-Hui Chu, Miao-Li County (TW); Fang-Ho Lin, Miao-Li County (TW); Chia-Lun Chen, Miao-Li County (TW); Yen-Liang Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 124 days.

(21) Appl. No.: 16/426,083

(22) Filed: May 30, 2019

(65) Prior Publication Data

US 2020/0004086 A1    Jan. 2, 2020

(30) Foreign Application Priority Data

Jun. 28, 2018    (CN) .......................... 201810685337.9

(51) Int. Cl.
*G02F 1/1335* (2006.01)
*G02F 1/13357* (2006.01)

(52) U.S. Cl.
CPC .. *G02F 1/133611* (2013.01); *G02F 1/133603* (2013.01); *G02F 1/133606* (2013.01); *G02F 1/133614* (2021.01)

(58) Field of Classification Search
CPC ......... G02F 1/133603; G02F 1/133606; G02F 1/133611; G02F 2001/133614
See application file for complete search history.

(56) References Cited

U.S. PATENT DOCUMENTS

| | | | | |
|---|---|---|---|---|
| 2011/0069496 | A1* | 3/2011 | Ing | ......................... F21V 5/007 362/311.02 |
| 2014/0334137 | A1* | 11/2014 | Hasenoehrl | ........... F21V 23/001 362/147 |
| 2015/0219840 | A1* | 8/2015 | Kwon | .................. G02B 6/0086 362/615 |

* cited by examiner

*Primary Examiner* — Tracie Y Green
(74) *Attorney, Agent, or Firm* — McClure, Qualey & Rodack, LLP

(57) ABSTRACT

A display device including a backlight module is provided. The backlight module includes: a substrate, a backlight cavity, a plurality of light emitting elements, and an optical adjustment layer. The backlight cavity is located on the substrate. The plurality of light emitting elements is disposed in the backlight cavity. The optical adjustment layer covers the plurality of light emitting elements and fills the remaining space of the backlight cavity. The optical adjustment layer has a refractive index n greater than the refractive index $n_0$ of the air.

20 Claims, 5 Drawing Sheets

DISPLAY DEVICE HAVING REDUCED SIZE AND IMPROVED ILLUMINATION

This application claims the benefit of People's Republic of China application Serial No. 201810685337.9, filed Jun. 28, 2018, the subject matter of which is incorporated herein by reference.

BACKGROUND

Field of the Invention

The present disclosure relates in general to a display device with backlight module.

Description of the Related Art

Display devices, such as TVs, computers, portable electronic devices, and public devices (such as automatic teller machines), have been widely used in people's daily life. Particular, liquid crystal display (LCD) devices have developed mature technology and have gained a great popularity. However, the liquid crystal display device requires a backlight module to provide a uniform illumination to the LCD panel. Moreover, as the LCD device is getting thinner and thinner, the thickness of the backlight module used in the LCD device tends to be reduced. Due to the above reasons, further improvements are expected of the backlight module. Even when the backlight module is used in other devices, similar expectations still exist.

SUMMARY

According to some embodiments of the present disclosure, a display device including a backlight module is provided. The backlight module includes: a substrate, a backlight cavity, a plurality of light emitting elements, and an optical adjustment layer. The backlight cavity is located on the substrate. The plurality of light emitting elements is disposed in the backlight cavity. The optical adjustment layer covers the plurality of light emitting elements and fills the remaining space of the backlight cavity. The optical adjustment layer has a refractive index n greater than the refractive index $n_0$ of the air.

The above and other aspects of the disclosure will become better understood with regard to the following detailed description of the embodiment (s). The following description is made with reference to the accompanying drawings.

DETAILED DESCRIPTION

Detailed descriptions of the embodiments of the disclosure are made with reference to accompanying drawings. The embodiments and accompanying drawings of the present disclosure are provided for exemplary and explanatory purposes, not for limiting the scope of protection of the disclosure. Whenever feasible, the devices, elements, and/or materials disclosed below can be replaced with other suitable devices, elements, and/or materials or taken in conjunction with other suitable devices, elements, and/or materials or some existing devices, elements, and/or materials can be removed from some embodiments and accompanying drawings. When two elements are described to have a positional relationship such as "on" or "under", the two elements can directly contact each other or can have another element interposed between the two elements. For the accompanying drawings to be illustrated more clearly, elements of the accompanying drawings may not reflect actual sizes. Besides, some elements and/or element designations may be omitted in the accompanying drawings. Designations common to the accompanying drawings and embodiments are used to indicate identical or similar elements. It goes without further descriptions that factors and features of an embodiment can be effectively included in another embodiment.

Figure 1:
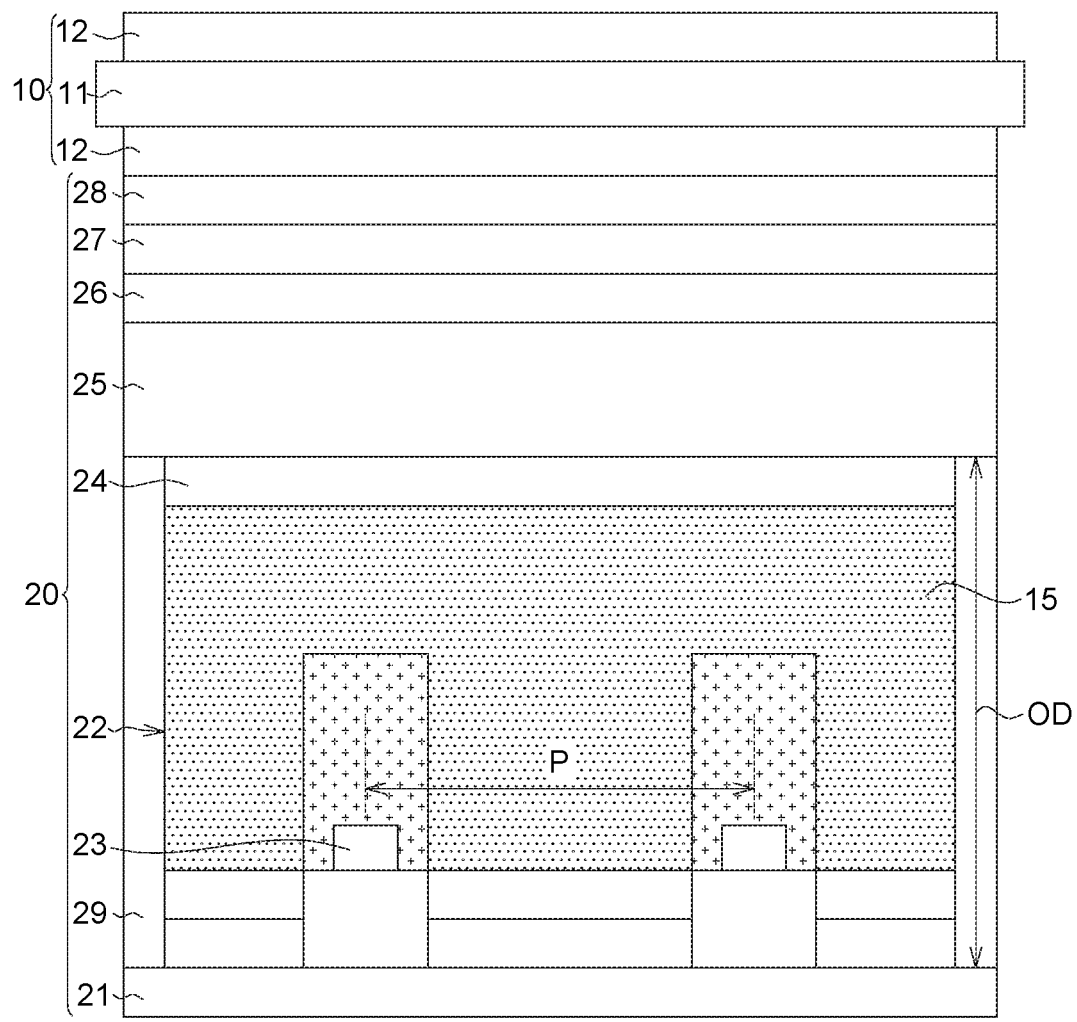
FIG. 1 is an exemplary diagram of a display device.

Referring to FIG. 1, an exemplary display device 1. The display device 1 includes a display panel 10 and a backlight module 20, wherein the display panel 10 is disposed on the backlight module 20.

The display panel 10 can be realized by such as a liquid crystal display panel illustrated in FIG. 1 as a liquid crystal control layer 11 and two polarizers 12. The two polarizers 12 are respectively disposed on a top side and a bottom side of the liquid crystal control layer 11. In some embodiments, the liquid crystal control layer 11 includes two substrates and a liquid crystal layer interposed between the two substrates. The liquid crystal control layer 11 may further include an alignment layer or an electrode layer.

According to an embodiment, the backlight module 20 includes a substrate 21, a backlight cavity 22, a plurality of light emitting elements 23, and an optical adjustment layer 15. The backlight cavity 22 is located on the substrate 21. The plurality of light emitting elements 23 are disposed in the backlight cavity 22. The optical adjustment layer 15 covers the plurality of light emitting elements 23 and fills the remaining space of the backlight cavity 22. For example, the substrate 21 can be realized by a circuit board, a glass substrate or a polymer substrate. The circuit board can be realized by a thin-film transistor (TFT) glass substrate or a TFT polyimine (PI) substrate. Each of the glass substrate and the polymer substrate may include a circuit or an active element. The substrate 21 may include a reflective layer (not illustrated) or be formed of a reflective material. The plurality of light emitting elements 23 can be realized by light-emitting diodes (LED) or micro or mini light-emitting diodes (micro LED or mini LED) or other suitable light emitting elements, but the present disclosure is not limited thereto. Each LED chip has a size in a range from 300 microns (μm) to 10 millimeters (mm), each mini LED chip has a size in a range from 100 μm to 300 μm, and each micro LED chip has a size in a range from 1 μm to 100 μm, but the present disclosure is not limited thereto. In some embodiments, the display device 1 can be realized by a flexible display device, a touch display device or a curved display device, but the present disclosure is not limited thereto. The plurality of light emitting elements 23 may have a pitch P defined as a distance from the center of a light emitting element 23 to the center of an adjacent light emitting element 23. The pitch P can also be defined as a distance from an edge of a light emitting element 23 to the corresponding edge of an adjacent light emitting element 23. The optical adjustment layer 15 has a refractive index n greater than the refractive index $n_0$ of the air, wherein n, being greater than or equivalent to 1.2 but less than or equivalent to 2, is such as 1.4 or 1.7. In some embodiments, the backlight module 20 may further include a diffusion layer 24 and a sidewall 29. The sidewall 29 is disposed on the substrate 21, surrounds the substrate 21 and connects the substrate 21 and the diffusion layer 24. The diffusion layer 24, the sidewall 29 and the substrate 21 define the backlight cavity 22. For example, the top surface of the substrate 21, the top surface of the diffusion layer 24, and the inner surface of the sidewall 29 define the backlight cavity 22. The optical adjustment layer 15 fills at least one part of the remaining space of the backlight cavity 22, such as 40% to 100% of the remaining space. As indicated in FIG. 1, the optical adjustment layer 15 completely fills the remaining space (up to 100% of the remaining space). Here, the "remaining space" means the space of the backlight cavity 22 deducted by the plurality of light emitting elements 23 and other elements (including but not limited to the reflective layer 106, the optical transparent adhesive 108, and other elements which may or may not be illustrated but are disposed in the backlight cavity 22), the fixing member (not illustrated), and other film layers. The backlight cavity 22 may have a backlight cavity height OD equivalent to the distance from the top surface of the substrate 21 to the top surface of the diffusion layer 24. The arrangement of the backlight cavity 22 and relevant elements is not limited to the exemplification in FIG. 1, and will be further explained below with reference to FIGS. 2-7.

Refer to FIG. 1 again. In some embodiments, the backlight module 20 may further include a diffusion layer 25 located in the backlight cavity 22. In the diffusion layer 25, the backlight module may further include at least one optical film configured to uniform the light provided to the display panel 10. FIG. 1 illustrates a diffusion layer 26, a prism layer 27, and a brightness enhancement film 28, which are sequentially stacked in a bottom up manner, but the quantity, type and stacking method of the optical film are not limited to the exemplification of FIG. 1. In some embodiments, the diffusion layer 24, the diffusion layer 25 and the diffusion layer 26 can be realized by films, layers, plates or other suitable forms. In another embodiment, the diffusion layer 24, the diffusion layer 25 and the diffusion layer 26 can be formed of identical or different materials, and can have identical or different thickness levels, diffusion particles ratios, hazes, hardness levels, manufacturing methods or other parameters.

Regarding the thickness reduction of the backlight module, since the substrate, the diffusion layer and the elements disposed thereon have little change in thickness, whether the backlight module can be thinned depends on whether the thickness of the backlight cavity can be reduced. An ordinary backlight cavity is an empty cavity (including air but lacking the optical adjustment layer 15 of the present disclosure). A commonly used method for assuring sufficient uniformity of the light provided by the backlight module is implemented by increasing cavity thickness, such that the light emitted by each of the plurality of light emitting element can be mixed in a longer optical path. The uniformity of the emitted light can also be improved by disposing an optical adjustment element, such as a secondary lens, on the optical element, such as an LED. However, to provide a sufficient space to the optical adjustment element, the reduction in cavity thickness becomes difficult. Suppose such optical adjustment element is a secondary lens. Under such design, the cavity needs to have a thickness of at least 8 mm. In the present disclosure, through the arrangement of the optical adjustment layer 15, the backlight cavity height OD of the backlight cavity 22 can be less than or equivalent to 2 mm, such as 0.5 mm, 1 mm or 1.5 mm. In some embodiments, the optical adjustment layer 15 can include or can be realized by a transparent material layer having a transmittance in a range of 70% to 100%, such as 80% or 90%. Exemplarily but not restrictively, the optical adjustment layer 151 comprises silicone resin or acrylic (poly (methyl 2-methylpropenoate), PMMA).

To assure that the backlight module 20 provides a uniform light, in some embodiments, the backlight module 20 of the present disclosure may have a mixing ratio $R_1$ less than 5% or even be less than or equivalent to 3%, such as 1%, 2% or 3%. The smaller the mixing ratio $R_1$, the larger the uniformity of the light provided by the backlight module. The mixing ratio $R_1$ is defined as: (Max−Min)/Max %, wherein Max and Min represent the maximum and the minimum of the measurement of the light field intensity of the backlight module 20. A region corresponding to 4 to 16 light emitting elements 23 can be specified in the backlight module 20. For example, the region corresponds to 2×2 or 4×4 light emitting elements 23. The region can be located around the center of the backlight module 20 or other suitable positions. Then, the distribution of the light field intensity in the region of the backlight module 20 is measured. Then, the maximum and the minimum can be obtained from the distribution of the light field intensity and used for calculating the mixing ratio $R_1$.

Besides, the backlight module 20 has an arrangement ratio $R_2$, which is defined as P/OD, wherein OD represents the backlight cavity height OD, and P represents the pitch P between two adjacent light emitting elements 23. In some embodiments, the arrangement ratio $R_2$ of the backlight module 20 of the present disclosure can be greater than or equivalent to 1, such as greater than or equivalent to 1 but less than or equivalent to 4. The arrangement ratio $R_2$ can even be greater than or equivalent to 2, such as 2, 2.5, 3 or 3.5. Thus, even when the backlight cavity height OD is reduced to 1 mm, there is no need to dispose a large quantity of the plurality of light emitting elements 23 at a larger intensity or dispose the plurality of light emitting elements 23 at a pitch P of 2 mm above to assure the uniformity of the outputted light. The design of the present disclosure helps to reduce the required quantity of the plurality of light emitting elements 23, and therefore reduce the cost further.

In the above embodiment, the liquid crystal display device is used as an exemplification. However, the backlight module of the present disclosure can also be used in other display device if the other display device is to be used in conjunction with the backlight module or if an electronic device other than the display device also needs to use the light emitting module.

Figure 2:
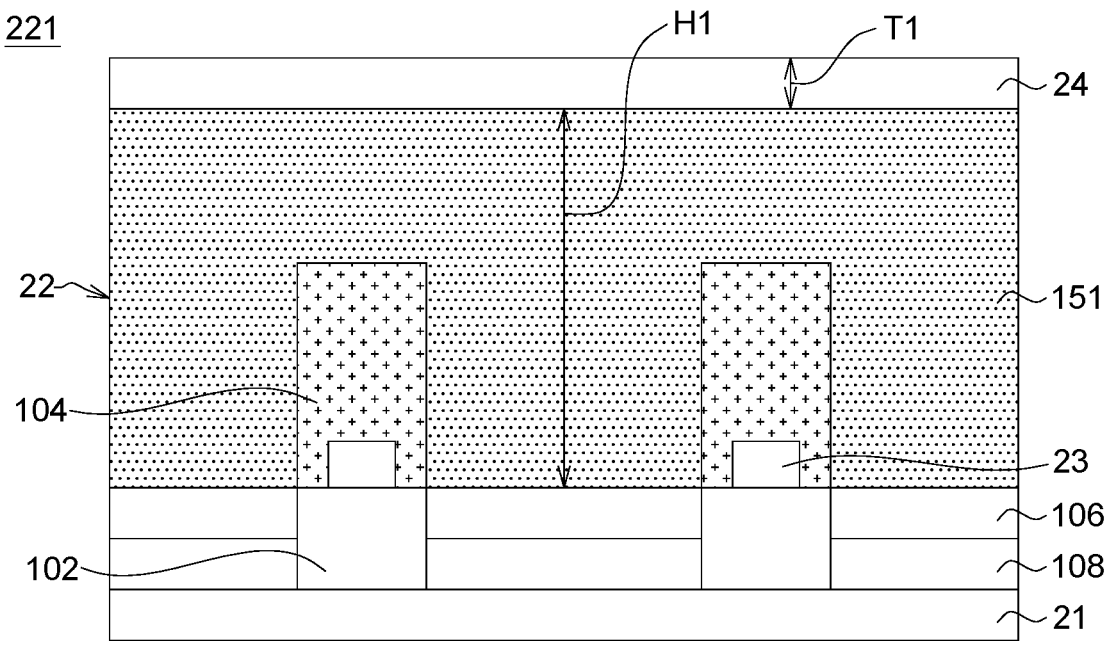
FIG. 2 is an exemplary arrangement diagram of a backlight cavity and relevant elements.

A number of arrangement examples of the backlight cavity and relevant elements that can be used in the backlight module 20 of the present disclosure are disclosed below. Referring to FIG. 2, an exemplary arrangement 221 of a backlight cavity and relevant elements is shown. In the arrangement 221, the backlight module 20 further includes a base 102, a phosphorescent structure 104, a reflective layer 106, and an optical transparent adhesive 108, which are all located in the backlight cavity 22. It can be understood that the backlight cavity 22 may include other necessary elements and/or appropriately omit some of the above elements. The base 102 is disposed on the substrate 21, and the plurality of light emitting elements 23 are disposed on the base 102 and therefore can be electrically connected to the substrate 21 through the base 102. For example, the base 102 may include a pad configured to electrically connect the plurality of light emitting elements 23 and the substrate 21. In some embodiments, a plurality of phosphorescent structures 104 respectively covering the plurality of light emitting elements 23 correspondingly. In an embodiment, the reflective layer 106 is located on the substrate 21 and surrounds the plurality of light emitting elements 23 for reflecting the light emitted from the plurality of light emitting elements 23 towards the backlight module 20 instead of the substrate 21. The surface of the reflective layer 106 can be flush with the surface of the base 102, but the present disclosure is not limited thereto. For example, the surface of the base 102 can be higher than the surface of the reflective layer 106. The optical transparent adhesive 108 is interposed between the reflective layer 106 and the substrate 21 for adhering the reflective layer 106 to the substrate 21. For example, if the reflective layer 106 has viscosity, then the optical transparent adhesive 108 can be omitted. The reflective layer 106 can also be formed on the substrate 21 by a coating process. In the arrangement 221, the optical adjustment layer 151 has a refractive index n greater than the refractive index $n_0$ of the air. The optical adjustment layer 151 includes a medium comprising polyoxyl resin (silicone resin) or acrylic (poly (methyl 2-methylpropenoate), PMMA).

Figure 3:
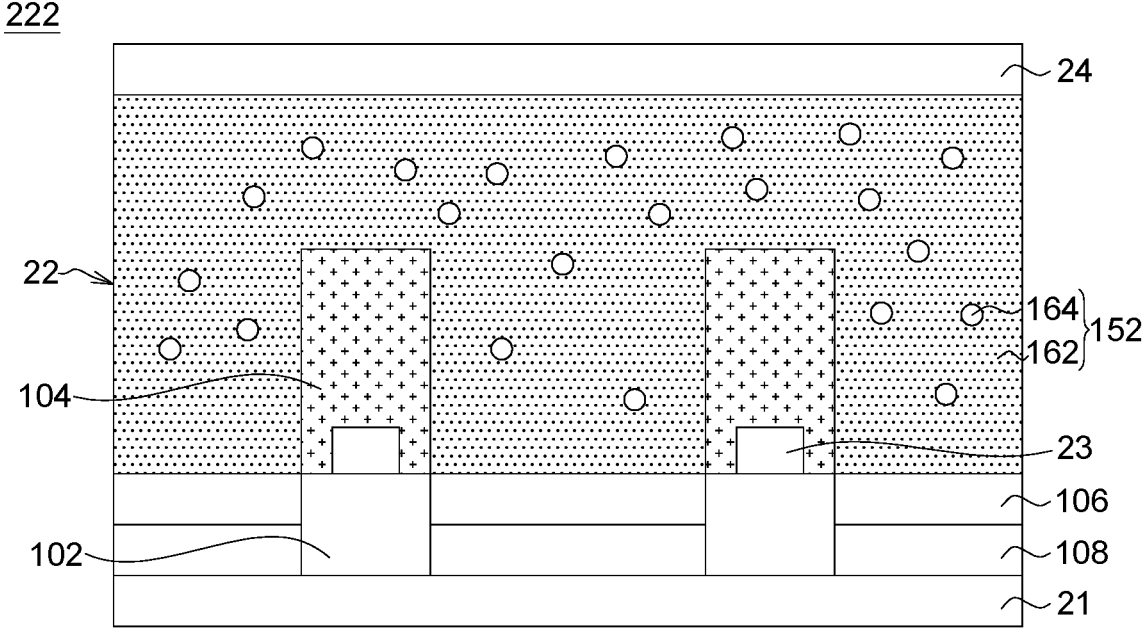
FIG. 3 is another exemplary arrangement diagram of a backlight cavity and relevant elements.

Referring to FIG. 3, another exemplary arrangement 222 of a backlight cavity and relevant elements is shown. The arrangement 222 is different from the arrangement 221 in that the optical adjustment layer 152 of the arrangement 222 includes a medium 162 and a plurality of diffusion particles 164 distributed in the medium 162, wherein the medium 162 is substantially identical to the medium of the optical adjustment layer 151. In the present disclosure, whether two elements are "identical" or "different" can be determined according to whether the two elements are consistent in terms of material, structure, and use, and can also be determined according to whether the two elements are consistent in terms of optical properties (particularly the refractive index). The plurality of diffusion particles 164 have a refractive index $n_d$ greater than the refractive index $n_m$ of the medium 162. The refractive index $n_d$ can be greater than or equivalent to 1.4 but less than or equivalent to 2.4, such as 1.5 or 2.2. The plurality of diffusion particles can cause the light of the plurality of light emitting elements 23 to be diffused, scattered, and/or refracted. The material of the diffusion particles 164 may comprise polystyrene, polymethyl methacrylate organic germanium, germanium dioxide ($SiO_2$) or zirconium dioxide ($ZrO_2$), but the present disclosure is not limited thereto. The plurality of diffusion particles 164 may occupy 0.01~90 wt % (such as 10 wt %, 30 wt % or 50 wt %) of the optical adjustment layer 152. It can be understood that with suitable composition and suitable percentages of the plurality of diffusion particles 164, the condition that the refractive index $n_d$ needs to be greater than $n_m$ can be satisfied. In some embodiments, the optical adjustment layer 152 comprises a plurality of reflective particles; and a material of the plurality of reflective particles comprises calcium carbonate, lead carbonate, zinc oxide, barium sulfate or titanium dioxide. The plurality of reflective particles may occupy 0.05~50 wt % of the optical adjustment layer 152. The optical adjustment layer 152 may include one or both of the plurality of diffusion particles 164 and the plurality of reflective particles.

Figure 4:
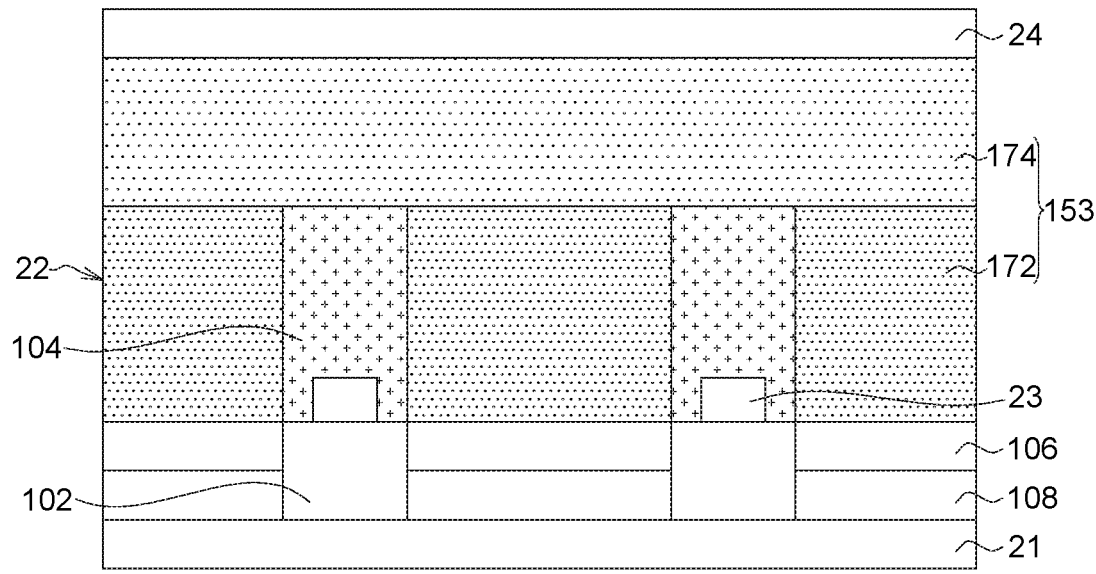
FIG. 4 is another exemplary arrangement diagram of a backlight cavity and relevant elements.

Referring to FIG. 4, another exemplary arrangement 223 of a backlight cavity and relevant elements is shown. The arrangement 223 is different from the arrangement 221 in that the optical adjustment layer 153 of the arrangement 223 is a composite layer structure, in which different layers can be formed of different materials and/or have different arrangements. For example, the optical adjustment layer 153 of FIG. 4 includes a first optical adjustment layer 172 and a second optical adjustment layer 174 disposed on the first optical adjustment layer 172, wherein the first optical adjustment layer 172 has a refractive index $n_1$, and the second optical adjustment layer 174 has a refractive index $n_2$ different from the refractive index $n_1$ of the first optical adjustment layer. In an embodiment as indicated in FIG. 4, the first optical adjustment layer 172 and the second optical adjustment layer 174 can be formed of the materials of the optical adjustment layer, but the material of the first optical adjustment layer 172 is different from that of the second optical adjustment layer 174. In another embodiment, one of the first optical adjustment layer 172 and the second optical adjustment layer 174 may include the plurality of diffusion particles or the plurality of reflective particles. In another embodiment, both of the first optical adjustment layer 172 and the second optical adjustment layer 174 may include the plurality of diffusion particles and/or the plurality of reflective particles. For example, the first optical adjustment layer 172 and the second optical adjustment layer 174 can be formed of the same material but include different diffusion particles. The first optical adjustment layer 172 and the second optical adjustment layer 174 can also be formed of different materials and include different diffusion particles. As long as the refractive index $n_2$ of the second optical adjustment layer 174 is different from the refractive index $n_1$ of the first optical adjustment layer 172, the materials and/or the arrangements of the first optical adjustment layer 172 and the second optical adjustment layer 174 are not subjected to specific restrictions. In an embodiment as indicated in FIG. 4, the top surface of the first optical adjustment layer 172 can substantially be flush with the top surface of the phosphorescent structures 104, but the present disclosure is not limited thereto. For example, the top surface of the first optical adjustment layer 172 can be higher than or lower than the top surface of the phosphorescent structures 104.

Figure 5:
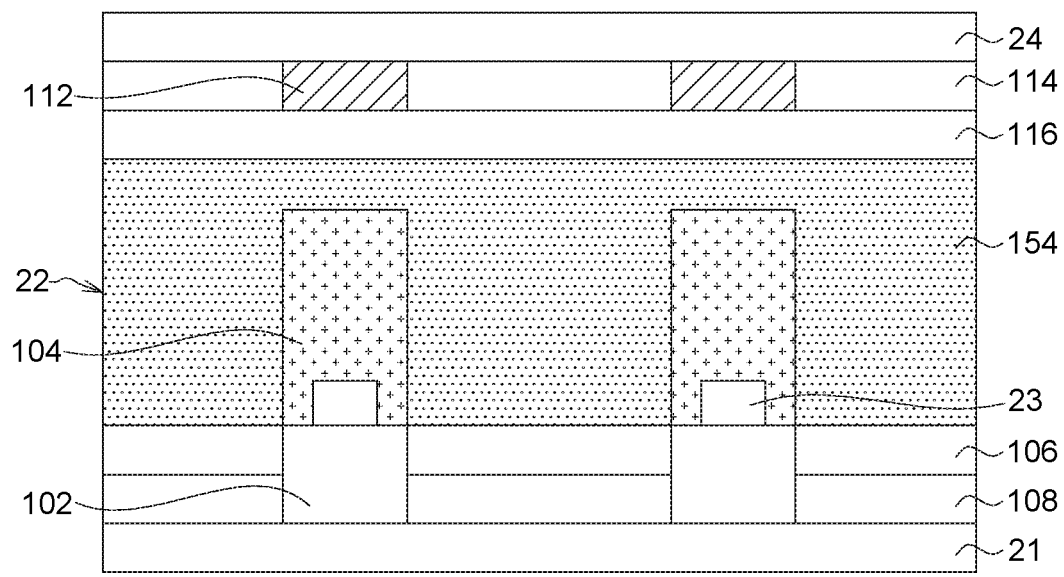
FIG. 5 is another exemplary arrangement diagram of a backlight cavity and relevant elements.

Referring to FIG. 5, another exemplary arrangement 224 of a backlight cavity and relevant elements is shown. The arrangement 224 is different from the arrangement 221 in that the backlight module 20 of the arrangement 224 further includes a plurality of light shielding elements 112 located in the backlight cavity 22 and on the plurality of light emitting elements 23 correspondingly for reducing the upward light and weakening the hot spots, which correspond to the plurality of light emitting elements 23 and can be viewed from the light exit side of the backlight module, to increase the uniformity of the outputted light. In an embodiment as indicated in FIG. 5, the plurality of light shielding elements 112 can be interposed between the diffusion layer 24 and the optical adjustment layer 154, the filling layer 114 is interposed between two adjacent light shielding elements of the plurality of light shielding elements 112, and the optical transparent adhesive 116 is interposed between the optical adjustment layer 154 and the plurality of light shielding elements 112. The filling layer 114 can be formed of the same material of the medium of the optical adjustment layer 15. In another embodiment, the plurality of light shielding elements 112 can be directly disposed on the phosphorescent structures 104. In an embodiment as indicated in FIG. 5, the plurality of light shielding elements 112 can be realized by cuboids. In other embodiment, the plurality of light shielding elements 112 can be realized by ellipsoids, pyramidic structures or other shapes. In an embodiment as indicated in FIG. 5, the plurality of light shielding elements 112 have a smooth surface. In another embodiment, bumpy structures can be formed on the surface of the plurality of light shielding elements 112. In an embodiment, the plurality of light shielding elements 112 can be realized by reflective structures. In another embodiment, the plurality of light shielding elements 112 can be realized by refractive structures. In another embodiment, the plurality of light shielding elements 112 can be realized by diffusion structures. The material, the shape and the arrangement of the plurality of light shielding elements 112 are not subjected to specific restrictions as long as the plurality of light shielding elements 112 are located on the plurality of light emitting elements 23 for weakening the hot spots formed on the light exit side by the plurality of light emitting elements 23. It can be understood that the optical adjustment layer 154 of the arrangement 224 can be similar to the optical adjustment layer 151, the optical adjustment layer 152 or the optical adjustment layer 153 (including various examples of application disclosed above).

Figure 6:
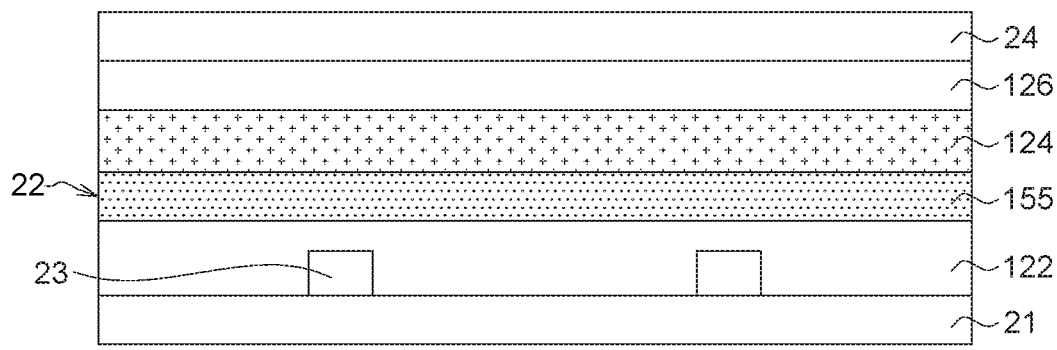
FIG. 6 is another exemplary arrangement diagram of a backlight cavity and relevant elements.

Referring to FIG. 6, another exemplary arrangement 225 of a backlight cavity and relevant elements. The arrangement 225 adopts the chip on board (COB) design. In the arrangement 225, the backlight module 20 may include a substrate 21, a plurality of light emitting elements 23, a package layer 122, an optical adjustment layer 155, a phosphorescent layer 124, and an optical transparent adhesive 126, which are all located in the backlight cavity 22. In some embodiments, the optical transparent adhesive 126 can be replaced by the optical adjustment layer. It can be understood that the backlight cavity 22 may include other necessary elements and/or may appropriately omit some of the above elements. In an embodiment, the package layer 122 can be omitted. In an embodiment as indicated in FIG. 6, the package layer 122 is disposed on the substrate 21 to cover and protect the plurality of light emitting elements 23. The optical adjustment layer 155 is disposed on the package layer 122. The optical adjustment layer 155 can be similar to the optical adjustment layer 154. The phosphorescent layer 124 is disposed on the optical adjustment layer 155, such that the optical adjustment layer 155 is interposed between the substrate 21 and the phosphorescent layer 124. The material of the phosphorescent layer 124 can be similar to that of the phosphorescent structures 104, and the phosphorescent material can be scatted in the medium comprising polyoxyl (silicone). The phosphorescent layer 124 is not subjected to specific restrictions as long as the phosphorescent layer 124 can provide similar optical adjustment properties of the phosphorescent structures 104. The optical transparent adhesive 126 is disposed on the phosphorescent layer 124. The optical transparent adhesive 126 is substantially identical to the optical transparent adhesive 108, but the present disclosure is not limited thereto. Under the COB design, the backlight cavity height OD can be reduced to be less than 0.6 mm, such as 0.3 mm or 0.4 mm. In comparison to the chip scale packing (CSP) light emitting elements having a larger volume (about 400 μm), the light emitting elements adopting the COB design can reduce the backlight cavity height OD.

Figure 7:
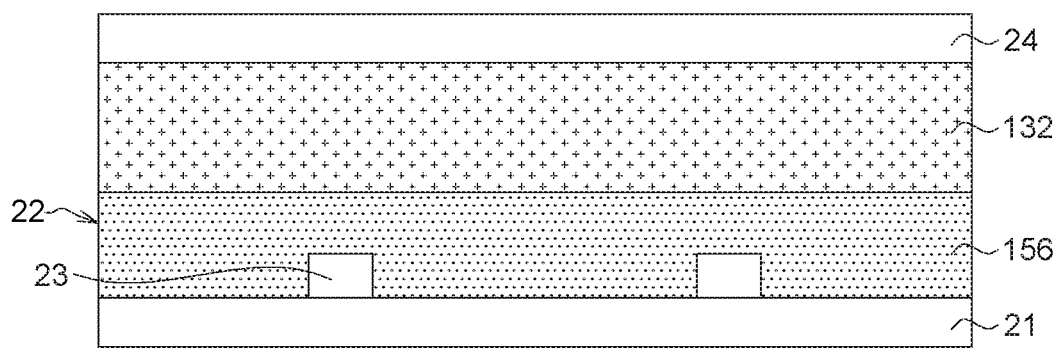
FIG. 7 is another exemplary arrangement diagram of a backlight cavity and relevant elements.

Referring to FIG. 7, another exemplary arrangement 226 of a backlight cavity and relevant elements is shown. The arrangement 226 is different from the arrangement 225 in that the arrangement 226 omits the package layer 122 and the optical transparent adhesive 126, which are included in the arrangement 225. Specifically, in the arrangement 225, the optical adjustment layer 156 directly covers and protects the plurality of light emitting elements 23. The phosphorescent layer 132 may have the same optical adjustment properties with the phosphorescent layer 124. In some embodiments, the phosphorescent layer 132 may have viscosity. For example, the phosphorescent layer 132 can mix a phosphorescent material in the adhesive, but the present disclosure is not limited thereto.

As disclosed in above embodiments, given that the present disclosure can be implemented, there is no need to restrict the design of the backlight module. That is, with any existing or possibly developed optical elements and accessories, the optical adjustment layer of the present disclosure can be filled to the place which is originally a cavity. Thus, given that the uniformity of the output light is assured, the backlight module can be further thinned. Furthermore, the quantity of the light emitting elements may even be reduced to reduce the cost.

For the backlight module of the present disclosure to be better understood, specific experiment examples of the backlight module and the results of experiment and simulation are disclosed below. In the experiment examples below, the same layers or the same particles are formed of the same materials.

Experiment Example 1

Experiment example 1 adopts an arrangement similar to that of the backlight module 20 of FIG. 1 but does not include the optical adjustment layer 15, wherein the arrangement of the backlight cavity 22 and relevant elements is similar to the design of the five-sided light emitting elements of FIG. 2. That is, the backlight cavity 22 is filled with air. In experiment example 1, the base 102 has a thickness of 250 μm. The reflective layer 106 has a thickness of 150 μm. The optical transparent adhesive 108 adheres the reflective layer 106 to the substrate 21, and has a thickness of 100 μm. The plurality of light emitting elements 23 is disposed on the base 102, and has a thickness of 100 μm. The pitch P is 5 mm. The phosphorescent structures 104 is located on the base and covers the plurality of light emitting elements 23, and has a thickness of 400 μm (measured from the top surface of the base). To match the design of the four-sided light emitting elements used in experiment examples 5~8, a polyoxyl resin layer having a thickness of 50 μm is disposed on the side of the diffusion layer 24 facing the substrate 21. A polyoxyl adhesive layer also having a thickness of 50 μm is further disposed on the side of the polyoxyl resin layer facing the substrate 21. A cavity having a height H1 of 500 μm is formed between the polyoxyl adhesive layer and the reflective layer 106. The diffusion layer 24 has a transmittance of 82%, a haze of 93%, and a thickness T1 of 50 μm. Thus, the overall backlight cavity height OD is 1 mm. The diffusion layer 25 has a transmittance of 40%, a haze of 99%, and a thickness of 1 mm. The diffusion layer 26 has a thickness of 130 μm. The prism layer 27 has a thickness of 155 μm. The brightness enhancement film 28 has a thickness of 390 μm.

Experiment Example 2

Experiment example 2 is different from experiment example 1 in that experiment example 2 adopts the optical adjustment layer 151 formed of a medium only as indicated in FIG. 2. The optical adjustment layer 151 is formed of polyoxyl resin, and has a thickness of 500 μm. A polyoxyl adhesive layer and a polyoxyl resin layer are disposed on the optical adjustment layer 151 to match the design of experiment examples 5~8. The optical adjustment layer 151 formed of polyoxyl resin, and the polyoxyl adhesive layer and another polyoxyl resin layer formed on the optical adjustment layer 151 substantially have an identical refractive index or similar refractive indexes.

Experiment Example 3

Experiment example 3 is different from experiment example 2 in that experiment example 3 adopts the optical adjustment layer 152 as indicated in FIG. 3. The optical adjustment layer 152 further includes a plurality of diffusion particles 164 distributed in the medium. The plurality of diffusion particles 164 occupy 5 wt % of the overall optical adjustment layer 152.

Experiment Example 4

Experiment example 4 is different from experiment example 3 in that in experiment example 4, the optical adjustment layer 152 includes a plurality of reflective particles rather than the plurality of diffusion particles. The plurality of reflective particles occupy 0.5 wt % of the overall optical adjustment layer.

Experiment Example 5

Experiment example 5 adopts an arrangement similar to that of the backlight module 20 of FIG. 1, but the arrangement of the backlight cavity 22 and relevant elements is similar to the design of the CSP four-sided light emitting elements of FIG. 5. Like experiment example 1, experiment example 5 does not include the optical adjustment layer 15. Experiment example 5 is different from experiment example 1 in that a plurality of reflective structures flight shielding elements 112) are disposed on the parts of the polyoxyl resin layer corresponding to the optical element 23, wherein the polyoxyl resin layer having a thickness of 50 μm is disposed on the polyoxyl adhesive layer. The reflective structures have a thickness of 50 μm.

Experiment Example 6

Experiment example 6 is different from experiment example 5 in that experiment example 6 adopts the optical adjustment layer 151 formed of a medium only as indicated in FIG. 2. The optical adjustment layer 151 is formed of polyoxyl resin, and has a thickness of 500 μm. A polyoxyl adhesive layer and a polyoxyl resin layer are sequentially disposed on the optical adjustment layer 151. The optical adjustment layer 151 formed of polyoxyl resin, and the polyoxyl adhesive layer and another polyoxyl resin layer formed on the optical adjustment layer 151 substantially have an identical refractive index or similar refractive indexes.

Experiment Example 7

Experiment example 7 is different from experiment example 6 in that experiment example 7 adopts the optical adjustment layer 152 as indicated in FIG. 3. The optical adjustment layer 152 further includes a plurality of diffusion particles 164 occupying 5 wt % of the overall optical adjustment layer 152.

Experiment Example 8

Experiment example 8 is different from experiment example 6 in that in experiment example 8, the optical adjustment layer 152 includes a plurality of reflective particles rather than the plurality of diffusion particles. The plurality of reflective particles occupy 0.5 wt % of the overall optical adjustment layer 152.

[Experiments and Simulation]

Figure 8:
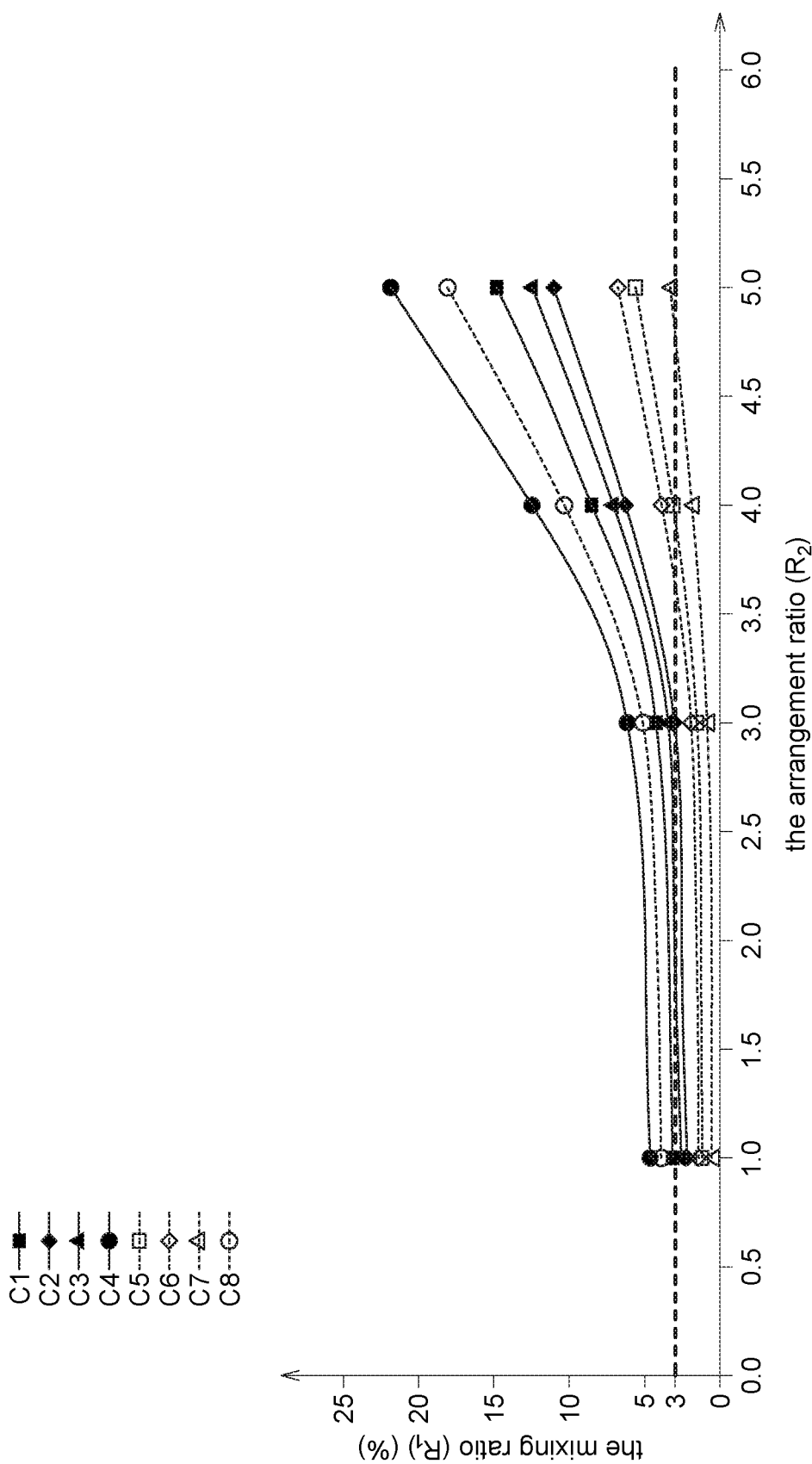
FIG. 8 is a chart showing the experimental and simulation results obtained from the comparison examples and embodiment of a backlight module.

A mixing ratio $R_1$ of the backlight module in each of experiment examples 1~8 is measured. In each experiment example, a distribution of light field intensity is obtained from the simulation, in which the backlight cavity height OD remains at 1 mm but the pitch P gradually changes, and the mixing ratio is further obtained from the distribution of light field intensity. FIG. 8 shows the relationship between the mixing ratio and the arrangement ratio obtained from 8 experiment examples, wherein the horizontal axis represents the arrangement ratio $R_2$ and the vertical axis represents the mixing ratio $R_1$. Curves C1 to C8 respectively represent the relationship obtained from experiment examples 1~8. These curves show the determination of the arrangement ratio $R_2$ when the mixing ratio of the display needs to be lower than a specific value (the smaller the specific value, and the larger the uniformity of the light). As indicated in Table 1, when the mixing ratio $R_1$ is pre-determined to be lower than 3% (the horizontal dotted line of FIG. 8), the corresponding arrangement ratio $R_2$ of each embodiment can be found from FIG. 8. FIG. 8 shows to what extent can the pitch of the light emitting elements be increased for the mixing ratio $R_1$ to meet the requirement of the specific value, such as lower than 3%, given that the backlight cavity height OD maintains at 1 mm. Besides, the quantity of light emitting elements actually required when used in a designated backlight module can be simulated using these arrangement ratios $R_2$, and the reduced ratio of light emitting elements can be calculated through normalization. The results are also listed in Table 1.

[Results and Discussion]

TABLE 1

| | General description | Corresponding curve | Arrangement ratio $R_2$ | Required quantity of light emitting elements | Reduced ratio of light emitting elements |
|---|---|---|---|---|---|
| Experiment example 1 | Five-sided light emitting elements; Cavity | C1 | 1.00 | 25108 | 0% |
| Experiment example 2 | Five-sided light emitting elements; Optical adjustment layer | C2 | 2.80 | 3125 | −88% |
| Experiment | Five-sided light emitting | C3 | 2.00 | 6192 | −75% |

TABLE 1-continued

| | General description | Corresponding curve | Arrangement ratio $R_2$ | Required quantity of light emitting elements | Reduced ratio of light emitting elements |
|---|---|---|---|---|---|
| example 3 | elements; Optical adjustment layer including diffusion particles | | | | |
| Experiment example 4 | Five-sided light emitting elements; Optical adjustment layer including reflective particles | C4 | N/A | N/A | N/A |
| Experiment example 5 | Four-sided light emitting elements; Cavity | C5 | 3.85 | 1629 | −94% |
| Experiment example 6 | Four-sided light emitting elements; Optical adjustment layer | C6 | 3.65 | 1817 | −93% |
| Experiment example 7 | Four-sided light emitting elements; Optical adjustment layer including diffusion particles | C7 | 4.75 | 1057 | −96% |
| Experiment example 8 | Four-sided light emitting elements; Optical adjustment layer including reflective particles | C8 | N/A | N/A | N/A |

As indicated in FIG. 8, given that the arrangement ratio maintains the same, when the optical adjustment layer is used, the five-sided light emitting type LED backlight module can obtain a better mixing ratio, that is, the uniformity of the outputted light of the backlight device can be improved. When the optical adjustment layer including diffusion particles is used, both the backlight module formed of five-sided light emitting elements and the backlight module formed of four-sided light emitting elements can obtain a better mixing ratio. Refer to FIG. 8 and Table 1. Given that the backlight cavity height OD maintains at 1 mm, for the mixing ratio $R_1$ to meet the requirement of a suitable level, the arrangement ratio of the backlight module including the optical adjustment layer (having a medium only and including diffusion particles) as indicated in experiment examples 2, 3, 6, 7 can be increased to 2.00 or even 4.75. Thus, the quantity of optical elements required by the backlight module can be effectively reduced as indicated in Table 1. Thus, given that the uniformity of the outputted light is assured, through the arrangement of the optical adjustment layer of the present disclosure, the backlight cavity height OD can be reduced to be under 2 mm, and the required quantity of optical elements can even be reduced to reduce the cost.

While the disclosure has been described by way of example and in terms of the embodiment (s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device, comprising:
a backlight module, comprising:
a substrate;
a backlight cavity located on the substrate;
a plurality of light emitting elements disposed in the backlight cavity; and
an optical adjustment layer covering the plurality of light emitting elements and filling a remaining space of the backlight cavity; and
a diffusion layer located on the backlight cavity,
wherein the optical adjustment layer has a refractive index n greater than the refractive index $n_0$ of the air;
wherein a height of the backlight cavity is larger than a maximum thickness of the diffusion layer.

2. The display device according to claim 1, wherein the backlight module further comprises:
a sidewall connecting the substrate and the diffusion layer;
wherein the diffusion layer, the sidewall and the substrate define the backlight cavity.

3. The display device according to claim 1, wherein the optical adjustment layer comprises a medium comprising polyoxyl resin or acrylic.

4. The display device according to claim 1, wherein the optical adjustment layer comprises a medium and a plurality of diffusion particles distributed in the medium, and the plurality of diffusion particles have a refractive index $n_d$ greater than a refractive index $n_m$ of the medium.

5. The display device according to claim 1, wherein the optical adjustment layer comprises a first optical adjustment layer and a second optical adjustment layer disposed on the first optical adjustment layer, the first optical adjustment layer has a refractive index $n_1$, and the second optical adjustment layer has a refractive index $n_2$ different from the refractive index $n_1$ of the first optical adjustment layer.

6. The display device 1 according to claim 5, wherein at least one of the first optical adjustment layer and the second optical adjustment layer comprises a plurality of diffusion particles or a plurality of reflective particles.

7. The display device according to claim 6, wherein the backlight module further comprises a phosphorescent structure located in the backlight cavity and correspondingly covering the plurality of light emitting elements.

8. The display device according to claim 1, wherein the backlight module further comprises a plurality of light shielding elements located in the backlight cavity and on the plurality of light emitting elements correspondingly.

9. The display device according to claim 8, wherein the backlight module further comprises a filling layer interposed between two adjacent light shielding elements of the plurality of light shielding elements.

10. The display device according to claim 9, wherein the backlight module further comprises an optical transparent adhesive interposed between the optical adjustment layer and the plurality of light shielding elements.

11. The display device according to claim 1, wherein the backlight module further comprises a phosphorescent layer located in the backlight cavity, and the optical adjustment layer is interposed between the substrate and the phosphorescent layer.

12. The display device according to claim 1, wherein the backlight module further comprises an optical transparent adhesive disposed on the phosphorescent layer.

13. The display device according to claim 1, wherein the backlight cavity has a backlight cavity height OD less than or equivalent to 2 mm.

14. The display device according to claim 13, wherein the plurality of light emitting elements have a pitch P above of 2 mm.

15. The display device according to claim 1, the diffusion layer has a transmittance of 82%, a haze of 93%, and a thickness of 50 μm.

16. The display device according to claim 1, wherein the optical adjustment layer comprises a medium and a plurality of diffusion particles distributed in the medium, and the plurality of diffusion particles occupy 0.01~90 wt % of the optical adjustment layer.

17. The display device according to claim 16, wherein a material of the diffusion particles comprises polystyrene, polymethyl methacrylate organic germanium, germanium dioxide (SiO2), zirconium dioxide (ZrO2) or combinations thereof.

18. The display device according to claim 1, wherein the optical adjustment layer comprises a plurality of reflective particles, a material of the reflective particles comprises calcium carbonate, lead carbonate, zinc oxide, barium sulfate or titanium dioxide.

19. The display device according to claim 18, wherein the plurality of reflective particles occupies 0.05~50 wt % of the optical adjustment layer.

20. The display device according to claim 1, wherein the backlight module further comprises a reflective layer located on the substrate and surrounds the plurality of light emitting elements.

* * * * *